United States Patent [19]

Clauss, Jr.

[11] 3,859,872

[45] Jan. 14, 1975

[54] AUTOMOTIVE TRANSMISSION

[75] Inventor: Julius A. Clauss, Jr., Birmingham, Mich.

[73] Assignee: Borg-Warner Corporation, Chicago, Ill.

[22] Filed: Jan. 29, 1973

[21] Appl. No.: 327,372

Related U.S. Application Data

[63] Continuation of Ser. No. 852,630, Aug. 25, 1969, abandoned.

[52] U.S. Cl. ................................. 74/763, 74/761
[51] Int. Cl. ........................................... F16h 57/10
[58] Field of Search ............ 74/730, 695, 688, 761, 74/763

[56] References Cited
UNITED STATES PATENTS

| | | | |
|---|---|---|---|
| 2,862,403 | 12/1958 | Miller | 74/763 |
| 3,095,764 | 7/1963 | Peras | 74/763 |
| 3,138,964 | 6/1964 | Stockton | 74/330 |
| 3,300,001 | 1/1967 | Stockton | 192/4 |
| 3,455,185 | 7/1969 | Ohno et al. | 74/688 |
| 3,491,621 | 1/1970 | Moan | 74/695 X |

Primary Examiner—Benjamin W. Wyche
Assistant Examiner—P. S. Lall
Attorney, Agent, or Firm—Donald W. Banner

[57] ABSTRACT

An automotive transmission having an hydraulic torque converter and planetary gearing with an output member between the converter and gearing and driven by the gearing, under the control of a compact assembly of axially spaced pairs of radially spaced friction engaging devices, to provide a plurality of forward speed ratios and a reverse speed ratio.

This invention relates to transmissions and controls therefor and, more particularly, to change speed transmissions and controls for use in automotive vehicles.

2 Claims, 1 Drawing Figure

PATENTED JAN 14 1975
3,859,872
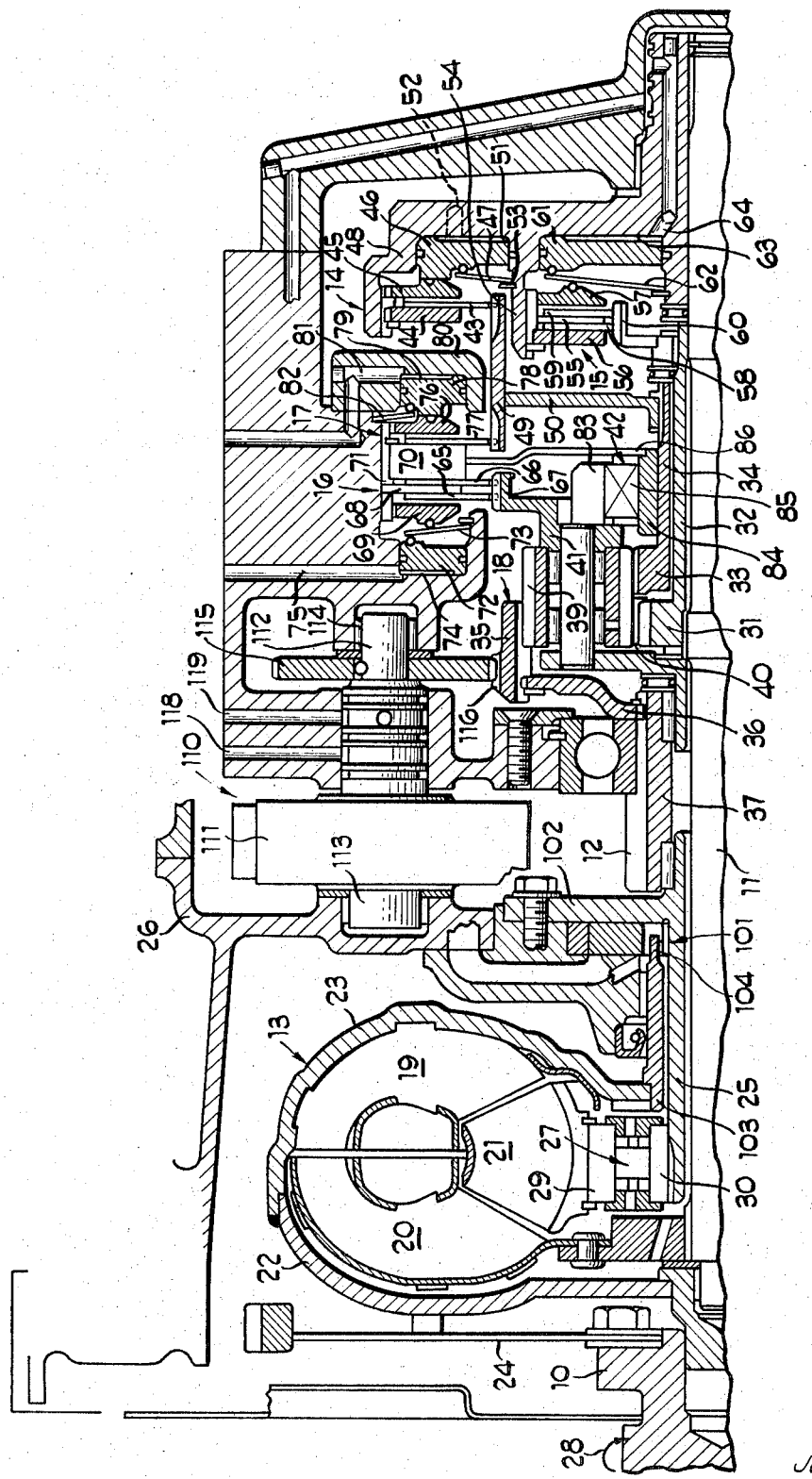
INVENTOR
JULIUS A. CLAUSS, JR.
BY Robert L. Zieg
ATTORNEY

AUTOMOTIVE TRANSMISSION

This is a continuation of U.S. Pat. application Ser. No. 852,630 filed Aug. 25, 1969, now abandoned.

SUMMARY OF THE INVENTION

An improved transmission and controls therefor and having an hydraulic torque converter with its turbine fixed to and drivingly directly connected to an input shaft, change-speed-ratio planetary gearing surrounding the input shaft and controllable, by friction engaging devices in the form of brakes and clutches, to drive a ring gear connected to an output member disposed axially of the input shaft between the hydraulic torque converter and the planetary gearing and drivingly connected to the wheels of an automotive vehicle. The friction engaging devices are disposed collectively at the rear of the transmission and arranged in pairs spaced axially of each other with the devices of each pair spaced radially of the axis of rotation of the input shaft.

An object of the invention is to provide an improved transmission and controls therefor.

Another object of the invention is to provide an improved transmission including planetary gearing and controls therefor to provide multiple forward speed ratios and a reverse speed ratio.

Another object of the invention is to provide an improved automotive vehicle transmission having a hydraulic torque converter with its driven turbine fixed to, and thereby directly connected, to an input shaft, planetary gearing operative by the input shaft, an output member located between the torque converter and the gearing and connected to the gearing and vehicle wheels, and means controlling the gearing to drive the output member at a plurality of speed ratios.

Another object of the invention is to provide an improved transmission having a hydraulic torque converter connected to planetary gearing surrounding and driven by an input shaft and provided with a control arrangement affording greater axial compactness of the transmission by pairs of friction-engaging devices in the form of brakes and clutches spaced axially of each other and with the devices of each pair spaced radially of the axis of rotation of the input shaft.

Another object of the invention is to provide an automotive transmission having an input shaft; and a hydraulic torque converter, an output member, planetary gearing connected to the output member, and a collective assembly of all controls for the gearing, arranged along the input shaft in the order named.

BRIEF DESCRIPTION OF THE DRAWING

The single FIGURE of the drawing is a vertical sectional view of a transmission embodying the invention, the view illustrating only the upper half of the transmission as the transmission mechanism is symmetrical about its horizontal axis.

DESCRIPTION OF THE PREFERRED EMBODIMENT

Referring to the drawing, the transmission comprises a vehicle engine-driven shaft 10, and an input shaft 11, and an output member 12 which is shown as a chain drive gear connectible by suitable means (not shown) with the driving road wheels of the automobile. The transmission comprises, in general, a hydraulic torque converter 13, friction-engaging devices in the form of hydraulically operated friction clutches 14 and 15, friction-engaging devices in the form of hydraulically operated friction brakes 16 and 17, and a planetary gear set 18.

The hydraulic torque converter 13 comprises a vaned impeller or drive element 19, a vaned turbine or driven element 20, and a vaned stator or reaction element 21. The vaned elements 19, 20 and 21 are disposed within a fluid-tight casing 22, a part of which is formed by the casing 23 of the impeller 19. The impeller 19 is driven from the shaft 10 through a thin flexible annular metal ring 24 fixed to the shaft 10 and casing 22. The turbine 20 is fixed to the input shaft 11. The stator 21 is rotatably disposed on a stationary sleeve 25 fixed to the transmission casing 26, and a one-way brake 27 is disposed between the stator 21 and sleeve 25. The one-way brake 27 may be of the sprag type of conventional form and operation, and so arranged as to allow free rotation of the stator 21 in the forward direction, that is, in the same direction in which the shaft 10 rotates as indicated by arrow 28 and prevents a rotation of the stator in the reverse direction by engaging the sprags with the inner and outer races 29 and 30 fixed to the stator 21 and sleeve 25.

The planetary gear set 18 comprises a sun gear 31 formed on a sleeve 32 surrounding and rotatably supported on input shaft 11, a sun gear 33 formed on sleeve 34 rotatable on sleeve 32, a ring gear 35 splined to a disc 36 which, in turn is splined to one end of a sleeve 37 provided with an output member or gear 12 adapted to mesh with a drive chain or gear (not shown) connected to vehicle-wheel driving mechanism. The gear set 18 also comprises a dual planet gear including a plurality of long planet gears 39, a plurality of short planet gears 40, and a planet gear carrier 41. The long planet gears 39 are in mesh with the sun gear 33 and ring gear 35, and the short planet gears 40 are in mesh with the sun gear 31 and long planet gears 39. Both of the sun gears 31 and 33 are adapted to be driven by the input shaft 11. The sun gears 31 and 33 are free to rotate relative to each other and shaft 11 and may be coupled to the shaft 11, as will be described. The planetary gear set is shown and described in greater detail in U.S. Pat. No. 3,117,464, issued June 14, 1964.

It will be noted the output member 12 is disposed between the hydraulic torque converter assembly 13 and the planetary gear set 18, permitting the transmission to be used advantageously in a variety of different positions in an automotive vehicle; for example, in either end of the vehicle to provide a front wheel drive or rear wheel drive, or it may be placed transversely of the vehicle, so that considerable versatility can be identified in vehicle design, the location of the input member also being instrumental in insuring stability of the operating transmission in the vehicle.

The planetary gear set 18 is controlled by the hydraulically-operated friction clutches 14 and 15 and friction brakes 16 and 17, and a friction-engaging device in the form of a one-way brake 42 of conventional roller and cam design, in a novel arrangement particularly adapted to provide compactness, and optimum operational facility of the transmission. More particularly, the friction clutches 14 and 15 are positioned to be spaced radially of each other and the input shaft 11 to provide axial compactness of the transmission. For the same purpose, the friction brakes 16 and 17 and one-way brake 42 are also radially spaced in a generally common plane transverse of the axis of the input shaft. Referring more particularly to the clutches 14 and 15, clutch 14 comprises a clutch disc 43, clutch pressure plates 44 and 45, a piston 46, and a Belleville washer 47 all disposed within an annular shell 48. The pressure plates 44 and 45 are splined within and to the shell 48, and the clutch disc 43 is splined to the exterior of an annular hub 49 which, in turn, is fixed to a plate 50 having its radially inner foot portion splined to the sleeve 34. The piston 46 is slidably disposed within an annular cavity 51 formed in the shell 48 and is adapted to engage clutch 14 when fluid under pressure is supplied to the cavity 51 through a port 52. The belleville washer 47 engages the piston 46 and also engages a retaining ring 53 fixed to an annular projection 54 extending from the shell 48 and operating to normally position the piston 46 in clutch-disengaging position. The Belleville washer 47 also functions as a spring to return the piston when fluid pressure is released from the cavity 51.

The friction clutch 15 is spaced radially inward of clutch 14 and in a common plane transverse to the axis of rotation of the input shaft 11. More particularly, the clutch 15 comprises a separator disc 55 splined to the annular projection 54 of the shell 48, pressure plates 56 and 57 also splined to the projection 54, and a pair of friction discs 58 and 59 splined to an annular hub 60 splined to sleeve 32, a piston 61, and a Belleville washer 62, all disposed within the annular projection 54 of the shell 48. The piston 61 is slidably disposed within an annular cavity 63 formed in the shell 48 and is adapted to engage clutch 15 when fluid under pressure is supplied to the cavity 63 through a port 64. The Belleville washer 62 functions as a lever between the piston 61 and pressure plate 57 to press the discs 55, 58 and 59 into engagement. The Belleville washer also functions as a spring for returning the piston 61 when fluid pressure is released from the cavity 63.

Referring to the friction-engageable devices or brakes 16 and 17, the brake 16 comprises friction discs 65 and 66 splined to radially outwardly extending annular portion 67 of the planetary gear carrier 41; a separator disc 68 and pressure plates 69 and 70 splined as at 71 to a radially inner annular surface of the transmission casing 26; a piston 72, and a Belleville washer 73, the piston 72 and washer 73 being disposed within an annular cavity 74 of the transmission casing 26. The piston 72 is slidable within the cavity 74 and adapted to engage brake 16 when fluid under pressure is supplied to the cavity 74 through a port 75. The Belleville washer 73 engages the piston 72 and pressure plate 69 and operates to normally position the piston in brake disengaging position while functioning as a lever by exerting pressure on the plate 69 to engage the brake when the piston is moved by fluid under pressure to hold the planet gear carrier 41 against rotation.

The brake 17 comprises a pressure plate 76, the pressure plate 70, friction disc 77, piston 78 and Belleville washer 82. The disc 77 is splined on hub 49 fixed to plate 50 splined to sleeve 34 having sun gear 33 formed on the end thereof. The pressure plate 76 is splined, as is plate 70, to the annular portion 71 of casing 26 and is movable by piston 78 to engage disc 77 to prevent rotation of sun gear 33. The piston 78 is disposed within a cavity 79 provided in a drum 80 and is movable upon fluid under pressure entering cavity 79 from a port 81. A Belleville washer 82 has its outer edge positioned in an annular slot in drum 80 and acts as a spring to retract piston 78 from pressure plate 76.

The friction engaging device 42 in the form of a one-way brake is disposed in radially spaced relation and alignment with the friction brake 16 and comprises an outer race 83, an inner race 84, and a plurality of tiltable sprags 85 disposed between the races. The outer race 83 is fixed to the planet gear carrier 41, and the inner race 84 is prevented from rotation by being fixed to the transmission casing by its attachment to a plate 86 anchored to pressure plate 70 splined to the transmission casing.

In the operation of the transmission, the planetary gearing is controllable to provide low, intermediate and high speed forward speed ratio drives and a reverse speed ratio drive. When clutches 14 and 15 and brakes 16, 17 and 42 are disengaged, the planetary gearing is in neutral and the input shaft 11 does not transmit drive from the torque converter to the output member 12.

To obtain low speed drive, the friction clutch 15 is engaged to provide drive between the input shaft 11 and sun gear 31 while the engaged one-way brake 42 holds the planet gear carrier stationary to function as a reaction member for the planetary gearing 18. Alternatively, the friction brake 16 may be engaged to hold the planet gear carrier stationary. Upon this occurrence, driving torque from the hydraulic torque converter 13 to the input shaft 11 is transmitted to the friction clutch 15 and to the sun gear 31, planet gears 40 and 39 to ring gear 35 to the driven output member or gear 12. The output member is connected to the vehicle road wheels by any suitable means (not shown).

Second or intermediate speed forward drive is provided by engaging the friction brake 17, and, if the low speed friction brake 16 is engaged, releasing brake 16. The engaged brake 17 functions to hold the sun gear 33 stationary which serves as a reaction member for the planetary gearing, the one-way brake 42 releasing and overrunning. In this condition, the engaged friction clutch 15 transmits drive from input shaft 11 to the sun gear 31 and, as the sun gear 33 now acts as a reaction member, the planet gears 39 and 40 drive the ring gear 35 and output member 12 at a higher speed ratio than for low speed forward drive.

To subsequently obtain high speed forward drive, the brake 17 is disengaged and clutch 14 is engaged, the one-way brake being in overrunning condition. The engagement of clutches 14 and 15 lock the sun gears 31 and 33 to rotate in unison which effectively locks up the planetary gearing 18 to provide direct drive 1:1 speed ratio between the input shaft 11 and output member 12.

Reverse drive is obtained by engaging friction clutch 14 and friction brake 16. As a result, driving torque is transmitted from the hydraulic torque converter 13, through the input shaft 11, shell 48, friction clutch 14, sun gear 33 planet gears 39, and ring gear 35 to the output member 12. As the brake 16 holds the planet gear carrier 41 stationary, the carrier functions as a reaction member and forward driving torque supplied to sun gear 33 is reversed by the planetary gear set 18 so that the ring gear 35 and output member 12 are driven in the reverse direction.

Between the torque converter 13 and the gear set 18 is a pump 101 adapted to supply fluid pressure for lubrication and for operation of the control system of the transmission (not illustrated). The pump 101 is mounted adjacent the radial extension 102 on the sleeve 25 and may be of any known type used in automatic transmissions, as for example, an internal/external gear pump of the crescent type. The converter casing 23 has a sleeve portion 103 having tangs 104 thereon adapted to drive an element of the pump 101 whereby the pump will be driven by the converter casing at engine speed.

A governor mechanism 110 is also provided for the transmission which, in order to conserve axial length of the transmission, is mounted in a location between the torque converter 13 and the gear set 18. In particular, the governor mechanism includes a governor body 111 mounted on shaft 112 which is mounted in bearings 113 and 114 which are received in portions of the transmission case 26. Drivingly connected to the shaft 112 is a driving gear 115 which meshes with teeth 116 provided on the external side of ring gear 35. Since the ring gear 35 is the output element of the gear set driving output gear 12, the governor will thus be driven at a speed related to vehicle speed as is desired for using the governor to provide a control signal for the transmission controls. Suitable passages 118 and 119 are illustrated provided in a portion of the casing for the transmission which are adapted to supply to and receive fluid pressure from the governor mechanism in the usual manner. It will be apparent that by mounting the novel governor mechanism at a point radially displaced from the transmission central axis, available space within the transmission casing is utilized for the governor without requiring additional axial length of the transmission mechanism.

It will be apparent that the automotive transmission of the present invention is characterized by its axial compactness, namely, by virtue of the hydraulic torque converter 13 having its impeller 23 directly connected to the drive shaft 10 and its turbine 20 splined to the input shaft 11; also, the friction clutches 14 and 15 being radially spaced in a common plane transverse to the input shaft axis; disposition of the friction brake 16 and one-way brake 42 also in a common plane intersecting the input shaft axis; and, additionally, the pressure plate 70 serving as such in a dual function for brakes 16 and 17 and also acting to restrain the race 84 of the brake 42 against rotation. It is also important to note that all of the control brakes and clutches for the planetary gearing are collectively located in a compact assembly rearwardly of the planetary gearing.

A further advantageous feature of the transmission is the arrangement of the planetary gearing and its brake and clutch controls in a manner to insure the location of the output member 12 between the hydraulic torque converter and planetary gearing axially of the input shaft 11. In this respect, the transmission can be located in a variety of positions in the vehicle frame to provide either front wheel or rear wheel drive of the vehicle.

While certain novel features of the invention have been shown and described, it will be understood that various changes and modifications in the form of details of the transmission illustrated, and in its operation, may be made by those skilled in the art without departing from the spirit of the invention, the scope of the invention being defined solely by the appended claims.

What is claimed is:

1. In an automotive transmission, a housing, a drive shaft; an input shaft; a hydraulic torque converter in said housing having an impeller connected to and driven by said drive shaft, and a turbine splined to one end of said input shaft; planetary gearing in said housing mounted at the opposite end of said input shaft; said gearing having an output element driven by said gearing; an output gear rotatable on said input shaft connected to said output element to be driven thereby and mounted in a space provided in said housing located between said hydraulic torque converter and said gearing; a governor shaft journaled in said housing parallel to said input shaft and extending through said space; a drive gear drivingly connected to said governor shaft and connected to be driven by said output element of said gearing; said governor shaft and drive gear located radially outwardly of said planetary gearing; a hydraulic governor assembly mounted on said governor shaft in said space and radially outwardly of said output gear and connected to be driven by said drive gear; and said output element of said gearing having external teeth to drive said drive gear on said governor shaft.

2. An automotive transmission as claimed in claim 1 wherein said output element comprises a ring gear.

* * * * *